United States Patent [19]

Tamanoi et al.

[11] Patent Number: 5,627,777

[45] Date of Patent: May 6, 1997

[54] MAGNETO-OPTICAL RECORDING MEDIUM

[75] Inventors: Ken Tamanoi; Kenji Shono, both of Kawasaki, Japan

[73] Assignee: Fujitsu Limited, Japan

[21] Appl. No.: 454,504

[22] Filed: May 30, 1995

[30] Foreign Application Priority Data

Sep. 5, 1994 [JP] Japan .................... 6-211104

[51] Int. Cl.$^6$ .................... G11C 13/04; G11C 11/42
[52] U.S. Cl. .................... 365/122; 365/215
[58] Field of Search .................... 365/122, 215, 365/120, 127

[56] References Cited

U.S. PATENT DOCUMENTS

| | | | |
|---|---|---|---|
| 5,143,798 | 9/1992 | Fujii | 365/122 |
| 5,224,068 | 6/1993 | Miyake et al. | 365/122 |
| 5,278,810 | 1/1994 | Takahashi et al. | 365/122 |
| 5,487,046 | 1/1996 | Watada et al. | 365/122 |

FOREIGN PATENT DOCUMENTS

| | | |
|---|---|---|
| 393058 | 4/1991 | Japan . |
| 4271039 | 9/1992 | Japan . |

Primary Examiner—Terrell W. Fears
Attorney, Agent, or Firm—Greer, Burns & Crain, Ltd.

[57] ABSTRACT

A magneto-optical recording medium includes a transparent substrate, a magnetic reproducing layer laminated on the transparent substrate and having an easy direction of magnetization perpendicular to a film surface, a nonmagnetic intermediate layer laminated on the magnetic reproducing layer, and a magnetic recording layer laminated on the nonmagnetic intermediate layer and having an easy direction of magnetization perpendicular to a film surface. When a reproducing laser beam is directed onto the recording medium, a temperature distribution is formed in a beam spot. The temperature distribution consists of a low-temperature region satisfying Hc>Hs and Hc>Hr, an intermediate-temperature region satisfying Hs>Hc and Hs+Hc>Hr, and a high-temperature region satisfying Hr>Hs+Hc, where Hc represents a coercive force of the reproducing layer, Hs represents a magnetostatic bonding force between the reproducing layer and the recording layer, and Hr represents a reproducing magnetic field. Two perpendicular magnetization masks are formed in the low-temperature region and the high-temperature region, and the magnetization of the recording layer is transferred to the reproducing layer by magnetostatic bond in the intermediate-temperature region.

4 Claims, 6 Drawing Sheets

MAGNETO-OPTICAL RECORDING MEDIUM

BACKGROUND OF THE INVENTION

1. Field of the Invention

The present invention relates to a high-density magneto-optical recording medium.

2. Description of the Related Art

A magneto-optical disk is known as a high-density recording medium, and an increase in information quantity gives rise to a desire for higher densities of the medium. While the higher densities may be realized by reducing the space of recorded marks, the recording and reproducing of the marks are limited by the size of a light beam (beam spot) on the medium. When the presence of only one recorded mark in the beam spot is set, an output waveform corresponding to "1" or "0" may be observed as a reproduction signal according to whether the recorded mark is present or absent in the beam spot.

However, when the presence of plural recorded marks in the beam spot is set by reducing the space of the recorded marks, no change in reproduction output occurs regardless of movement of the beam spot on the medium. Accordingly, the output waveform becomes linear and the presence or absence of the recorded mark in the beam spot cannot be identified. To reproduce such small recorded marks having a period smaller than the size of the beam spot, it is sufficient to reduce the beam spot to a small size. However, since the size of the beam spot is limited by the wavelength $\lambda$ of a light source and the numerical aperture NA of an objective lens, the beam spot cannot be sufficiently reduced to a small size.

There has recently been proposed a reproducing method using magnetically induced super resolution such that a recorded mark smaller in size than the beam spot can be reproduced by the use of an existing optical system. According to this method, the resolution of reproduction is improved by masking other marks during reproduction of one mark in the beam spot. Accordingly, a super resolution disk medium is required to have at least a mask layer or a reproducing layer for masking other marks so that only one mark may be reproduced during signal reproduction, in addition to a recording layer for recording marks.

Japanese Patent Laid-open No. Hei 3-93058 discloses a method of increasing a reproducing resolution with a magneto-optical recording medium having a nonmagnetic intermediate layer interposed between a reproducing layer and a recording layer both formed from a perpendicular magnetization film. However, the reproducing method described in this publication has a problem such that when a reproducing power is increased, a recorded mark transfer region is widened to cause a decrease in reproduction output. As another conventional method, Japanese Patent Laid-open No. Hei 4-271039 discloses an information reproducing method using a medium having a magnetic intermediate layer interposed between a reproducing layer and a recording layer to form two mask regions in a beam spot, thereby maintaining a high resolution to eliminate a decrease in reproduction output in spite of an increase in reproducing power. However, the information reproducing method described in this publication has a problem such that it is necessary to initialize the reproducing layer by using an initializing magnetic field of several kilo-oersteds (kOe) after recording information on the medium, and that it is also necessary to apply a reproducing magnetic field of 200 oersteds (Oe) or more in order to form the two mask regions in the beam spot.

As mentioned above, in the conventional magnetic super resolution magneto-optical disk medium having the nonmagnetic intermediate layer interposed between the reproducing layer and the recording layer to transfer information recorded in the recording layer to the reproducing layer by magnetostatic bond, an increase in reproducing power causes a decrease in reproduction output. Further, in the other conventional magnetic super resolution magneto-optical disk medium having the magnetic intermediate layer interposed between the reproducing layer and the recording layer to form masks for preventing a decrease in reproduction output in the beam spot, a large reproducing magnetic field of 200 Oe or more and a large initializing magnetic field of several kOe are required. In an ordinary magneto-optical disk unit currently used, no magnetic field is applied in reproducing information. Accordingly, information recorded on the magneto-optical disk unit cannot be reproduced by the ordinary magneto-optical disk unit.

SUMMARY OF THE INVENTION

It is therefore an object of the present invention to provide a magneto-optical recording medium which can eliminate reduction in reproduction output even when reproducing power is increased.

It is another object of the present invention to provide a magneto-optical recording medium which can realize a high resolution only by applying a small initializing magnetic field and a small reproducing magnetic field.

In accordance with an aspect of the present invention, there is provided a magneto-optical recording medium comprising a transparent substrate; a magnetic reproducing layer laminated on the transparent substrate, the magnetic reproducing layer having an easy direction of magnetization perpendicular to a film surface; a nonmagnetic intermediate layer laminated on the magnetic reproducing layer; and a magnetic recording layer laminated on the nonmagnetic intermediate layer, the magnetic recording layer having an easy direction of magnetization perpendicular to a film surface; wherein when a reproducing laser beam is directed onto the recording medium, a temperature distribution is formed in a beam spot, the temperature distribution comprising a low-temperature region satisfying Hc>Hs and Hc>Hr, an intermediate-temperature region satisfying Hs>Hc and Hs+Hc>Hr, and a high-temperature region satisfying Hr>Hs+Hc, where Hc represents a coercive force of the magnetic reproducing layer, Hs represents a magnetostatic bonding force between the magnetic recording layer and the magnetic reproducing layer, and Hr represents a reproducing magnetic field.

Preferably, the magnetic reproducing layer is formed from a GdFeCo amorphous alloy film containing 23 at % to 25 at % of Gd.

In the low-temperature region formed in the reproducing beam spot, the magnetization of the reproducing layer maintains the direction of an initializing magnetic field to form a mask. In the high-temperature region, the magnetization of the reproducing layer is oriented in the direction of a reproducing magnetic field to form a mask. In the intermediate-temperature region between the two masks, the magnetization of the recording layer is transferred to the reproducing layer by magnetostatic bond. In this manner, the two masks are formed in the reproducing beam spot to thereby prevent a reduction in reproduction characteristics due to an increase in reproducing power. Furthermore, as the magnetization of the recording layer is transferred to the reproducing layer by using the magnetostatic bond, the two mask regions can be formed in the beam spot without the need of a large initializing magnetic field and a large reproducing magnetic field, and a high reproduction resolution can be maintained in spite of an increase in reproducing power.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
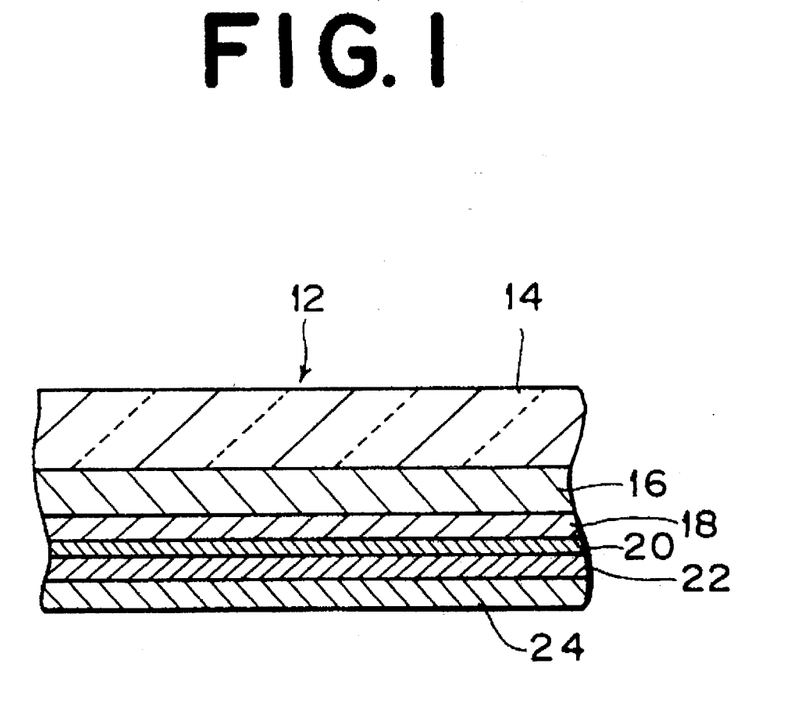
FIG. 1 is a sectional view of a magneto-optical recording medium according to a preferred embodiment of the present invention.

The structure of a magneto-optical recording medium 12 according to a preferred embodiment of the present invention will be described with reference to FIG. 1. The magneto-optical recording medium 12 is usually in the form of disk. A base layer 16 formed of SiN or the like by sputtering, for example, is laminated on a transparent substrate 14 formed of glass or the like. The base layer 16 prevents oxidation and corrosion of a magnetic layer laminated thereon. Resins such as polycarbonate, polymethyl methacrylate, and amorphous polyolefin may be adopted as the transparent substrate 14. Metal nitrides such as AlN, metal oxides such as $SiO_2$ and $Al_2O_3$, and metal sulfides such as ZnS may be adopted as the base layer 16.

A magnetic reproducing layer 18 formed from a rare earth-transition metal amorphous alloy film such as GdFeCo is laminated on the base layer 16. The magnetic reproducing layer 18 is a perpendicular magnetization film having an easy direction of magnetization perpendicular to its film surface. A nonmagnetic intermediate layer 20 formed of SiN or the like is laminated on the magnetic reproducing layer 18. Metal nitrides such as AlN, metal oxides such as $SiO_2$ and $Al_2O_3$, and metal sulfides such as ZnS may be adopted as the nonmagnetic intermediate layer 20.

A magnetic recording layer 22 formed from a rare earth-transition metal amorphous alloy film such as TbFeCo is laminated on the nonmagnetic intermediate layer 20. The magnetic recording layer 22 has an easy direction of magnetization perpendicular to its film surface. As the nonmagnetic intermediate layer 20 is interposed between the magnetic reproducing layer 18 and the magnetic recording layer 22, the exchange bond between the magnetic reproducing layer 18 and the magnetic recording layer 22 is perfectly cut off. The nonmagnetic intermediate layer 20 must be thin enough to permit the magnetostatic bond between the magnetic recording layer 22 and the magnetic reproducing layer 18 when heated to a given temperature region. Specifically, the thickness of the nonmagnetic intermediate layer 20 is preferably in the range of 1 nm to 10 nm.

A protective film 24 is laminated on the magnetic recording layer 22 to complete the magneto-optical recording medium 12. The protective film 24 prevents entry of water, oxygen, or other substances such as halogen from the air to protect the magnetic recording layer 22. Metal nitrides such as SiN and AlN, metal oxides such as $SiO_2$ and $Al_2O_3$, and metal sulfides such as ZnS may be adopted as the protective film 24.

Figure 2:
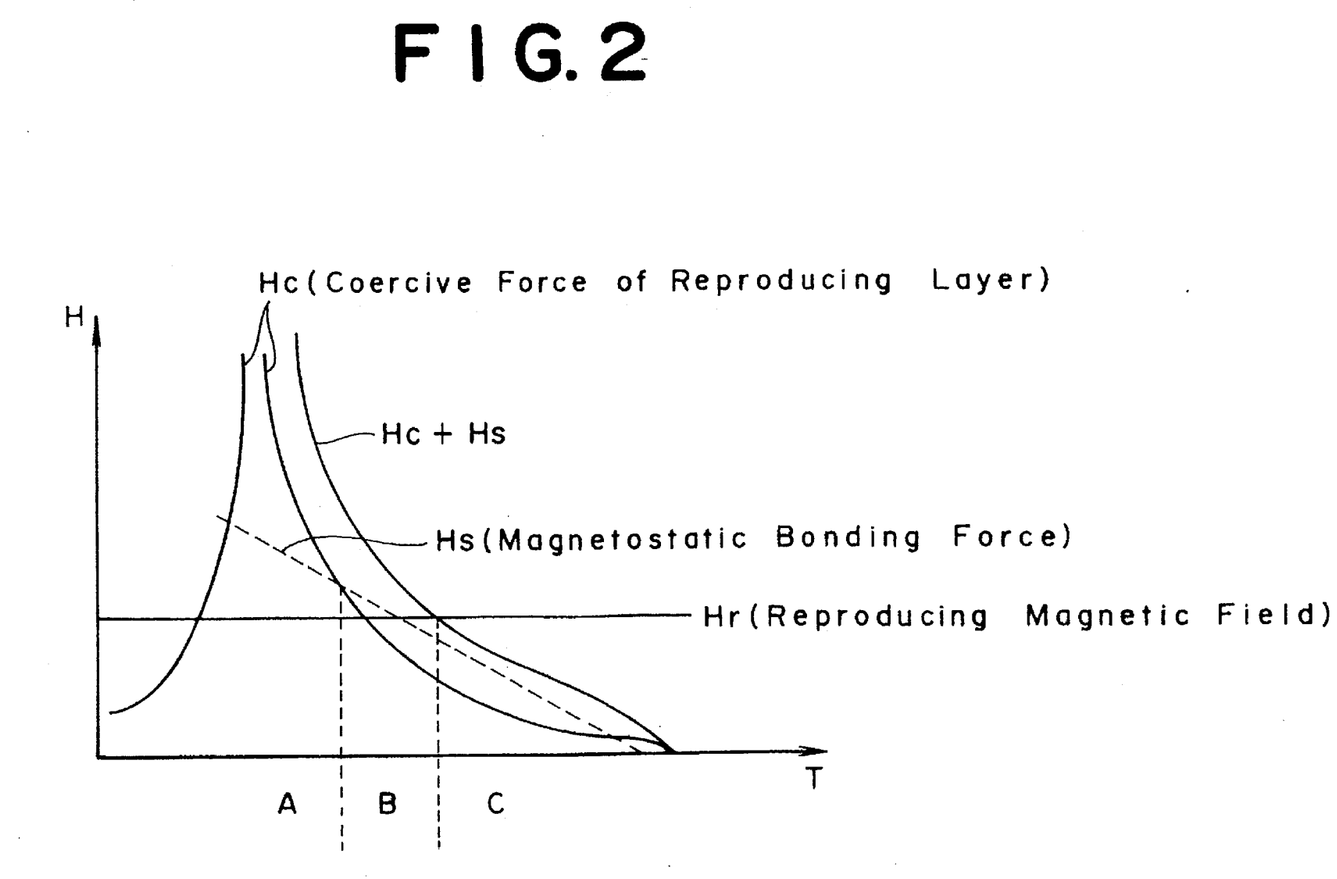
FIG. 2 is a graph showing a magnetic characteristic of the recording medium.

FIG. 2 is a graph showing a coercive force Hc of the reproducing layer 18, a magnetostatic bonding force Hs between the reproducing layer 18 and the recording layer 22, the sum (Hc+Hs) of the coercive force of the reproducing layer 18 and the magnetostatic bonding force, and a reproducing magnetic field Hr in relation to temperatures. A low-temperature region A shows that the coercive force Hc of the reproducing layer 18 is larger than the magnetostatic bonding force Hs. In other words, the low-temperature region A is a region where the arrangement of initialized magnetization of the reproducing layer 18 in one direction is kept regardless of the direction of magnetization of the recording layer 22.

An intermediate-temperature region B shows that the magnetostatic bonding force Hs is larger than the coercive force Hc of the reproducing layer 18 and that the sum (Hs+Hc) is larger than the reproducing magnetic field Hr. In other words, the intermediate-temperature region B is a region where the direction of magnetization of the reproducing layer 18 is inverted by the magnetostatic bonding force to allow transfer of magnetization of the recording layer 22 to the reproducing layer 18. However, since the direction of magnetization of the reproducing layer 18 must not become identical with the direction of the reproducing magnetic field Hr, the condition of Hs+Hc>Hr must be simultaneously satisfied. A high-temperature region C shows that Hc+Hs<Hr and the direction of magnetization of the reproducing layer 18 becomes identical with the direction of the reproducing magnetic field Hr.

In recording information, a bias magnetic field is applied upward, for example, and the medium is heated to a temperature near the Curie temperature of the recording layer 22. Accordingly, the direction of magnetization of the recording layer 22 becomes upward. The direction of magnetization of the recording layer 22 is transferred to the reproducing layer 18 by the magnetostatic bonding force, and the direction of magnetization of the reproducing layer 18 therefore becomes upward. Accordingly, in a region irradiated with a recording power, the directions of magnetization of the recording layer 22 and the reproducing layer 18 become upward. In a region where no recorded data is present (i.e., in a region irradiated with power corresponding to a reproducing power), the directions of magnetization of the recording layer 22 and the reproducing layer 18 becomes a data erasing direction, i.e., downward. It is sufficient to set the strength of the bias magnetic field Hr in recording to 500 Oe or less.

Figure 3A:
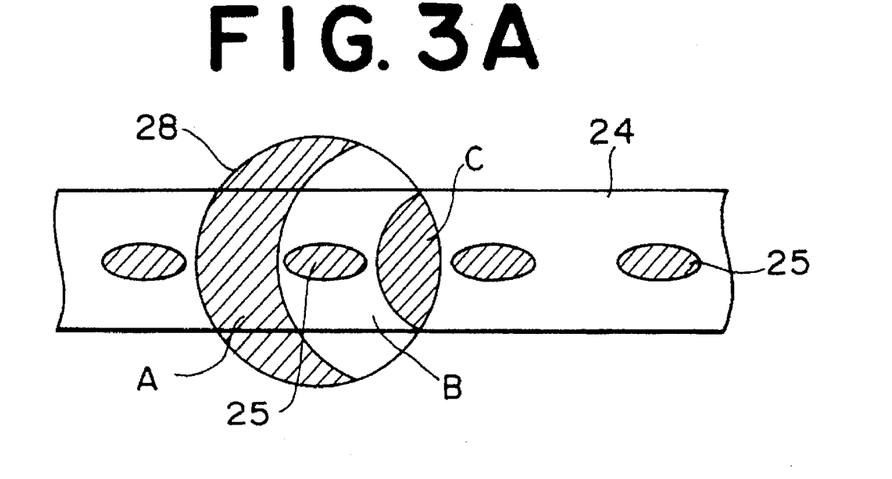
FIG. 3A is a view illustrating a temperature distribution in a beam spot in reproducing information.
Figure 3B:
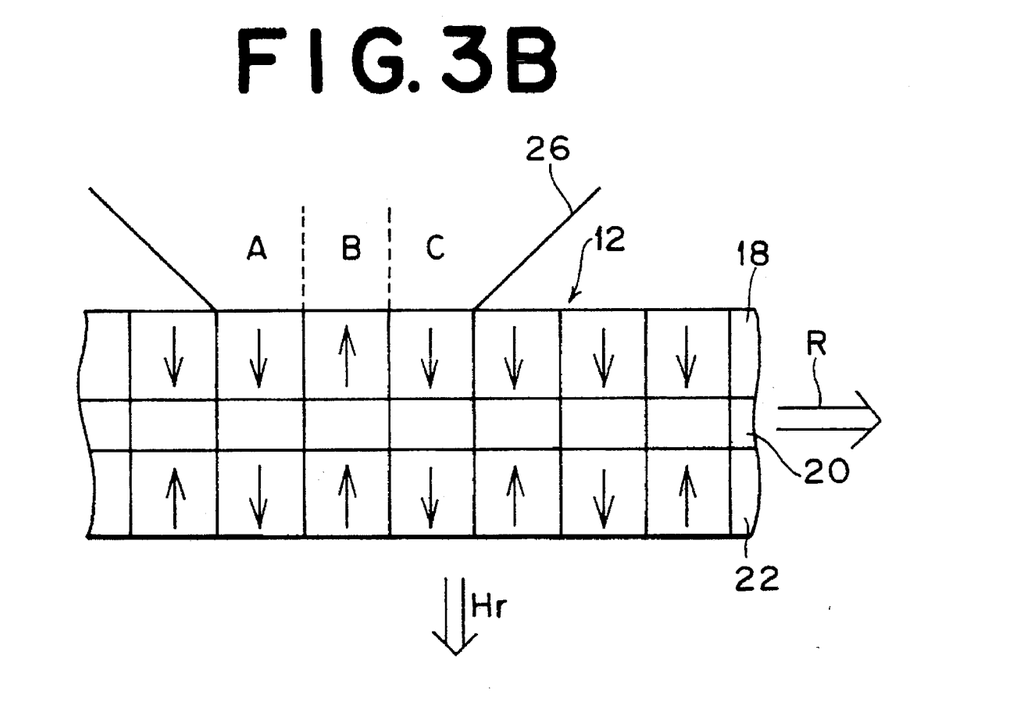
FIG. 3B is a view illustrating a magnetized condition of the recording medium in reproducing information.

A method of reproducing information recorded on the magneto-optical recording medium will now be described with reference to FIGS. 3A and 3B. Prior to reproduction, an initializing magnetic field is applied downward to arrange the magnetization of the reproducing layer 18. At this time, it is sufficient to set the strength of the initializing magnetic field to 500 Oe or less, because the coercive force of the reproducing layer 18 is small. In FIG. 3A, a plurality of marks 25 are recorded on a track 24 of the recording medium. In FIG. 3B, the recording medium 12 is rotated in the direction shown by an arrow R.

When a reproducing laser beam 26 is directed onto the track 24 of the medium, a beam spot 28 is formed on the track 24. As the medium 12 is rotated in the direction of arrow R, a low-temperature region A, an intermediate-temperature region B, and a high-temperature region C are formed in the beam spot 28. These three temperature regions correspond to the three temperature regions shown in FIG. 2. In the low-temperature region A, the magnetostatic bonding force Hs between the reproducing layer 18 and the recording layer 22 is smaller than the coercive force Hc of the reproducing layer 18, so that the magnetization of the reproducing layer 18 maintains the initialized direction of magnetization to form a mask.

In the intermediate-temperature region B, the magnetostatic bonding force Hs exceeds the coercive force Hc of the reproducing layer 18, so that the magnetization of the recording layer 22 is transferred to the reproducing layer 18. In the high-temperature region C, the reproducing bias magnetic field Hr applied downward is larger than the sum of the magnetostatic bonding force Hs and the coercive force Hc of the reproducing layer 18, so that the magnetization of the reproducing layer 18 is arranged in the direction of the reproducing magnetic field to form a mask. While the low-temperature mask region A decreases in area with an increase in reproducing power, the high-temperature mask region C having the magnetization arranged in the direction of the reproducing magnetic field increases in area at the same time. Accordingly, the intermediate-temperature region, that is, the recorded mark transfer region B is substantially almost unchanged, so that a reproduction output is not reduced regardless of the increase in reproducing power.

As both the coercive force Hc of the reproducing layer 18 and the magnetostatic bonding force Hs between the reproducing layer 18 and the recording layer 22 are small, it is sufficient to set the strength of the reproducing magnetic field Hr to 100 Oe or less, and a magnetic field leaked from an optical head of a magneto-optical disk unit may be used as the reproducing magnetic field. This will be described with reference to FIG. 4. An objective lens actuator 34 includes two yokes 38 and 40 provided on a yoke base 36 and two permanent magnets 42 and 44 provided on the two yokes 38 and 40, respectively. The objective lens actuator 34 further includes a focusing coil (not shown) for performing the focusing of an objective lens 46 and a tracking coil (not shown) for performing the tracking.

Figure 4:
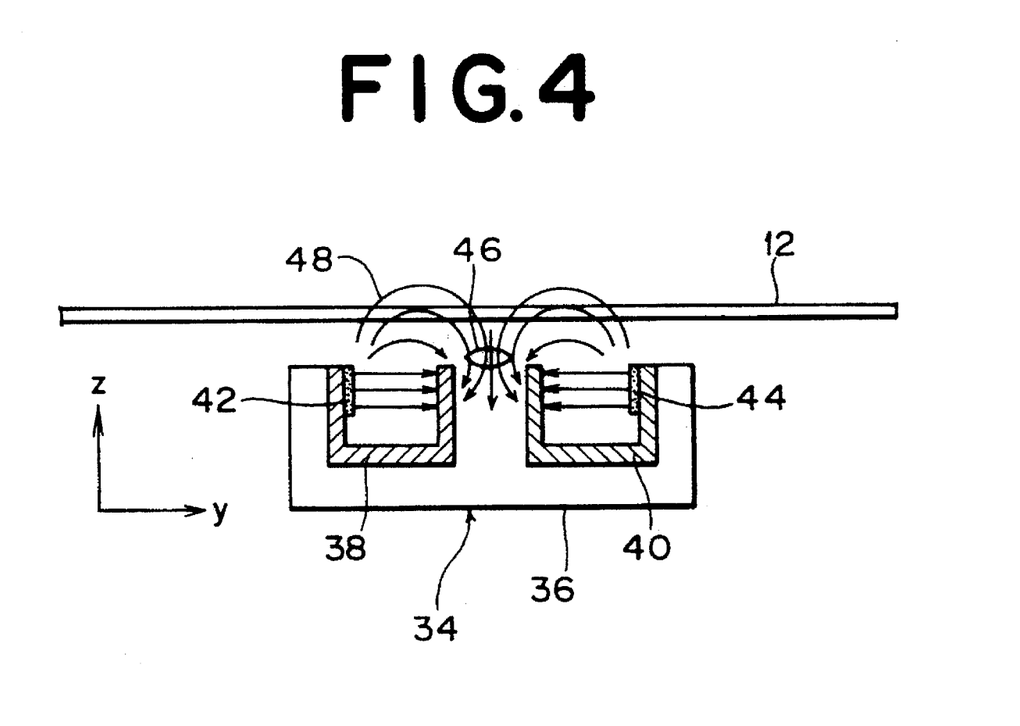
FIG. 4 is a view illustrating a magnetic field leaked from a lens actuator.

The permanent magnets 42 and 44 are located greatly near the magneto-optical disk 12, so that lines of magnetic force 48 leaked from the permanent magnets 42 and 44 have an influence upon the magneto-optical disk 12. Thus, when the coercive force Hc of the reproducing layer 18 is greatly small, the magnetic fields leaked from the permanent magnets 42 and 44 can be used as the bias magnetic field for reproduction.

The formation of the high-temperature region C in the beam spot 28 requires that the coercive force Hc of the reproducing layer 18 becomes small at high temperatures as shown in FIG. 2. To meet this requirement, it is desirable to use as the reproducing layer 18 a rare earth-transition metal amorphous alloy film in which the magnetization of the transition metal is dominant (TM rich). Also in the intermediate-temperature region B, it is desirable that the coercive force Hc of the reproducing layer 18 is small. This is due to the fact that if the coercive force Hc of the reproducing layer 18 is excessive, the magnetization of the recording layer 22 cannot be transferred.

To the contrary, in the low-temperature region A, it is desirable that the coercive force Hc of the reproducing layer 18 is large. This is due to the fact that if the coercive force Hc of the reproducing layer 18 is smaller than the magnetostatic bonding force Hs, the mask cannot be formed. Further, it is desirable to use a material having a large Kerr rotation angle as the material of the reproducing layer 18, in order to obtain a large reproduction output in reproducing an information signal. In consideration of the above points, it is desirable to use as the reproducing layer 18 a GdFeCo film having a compensation temperature near room temperature.

In particular, if the coercive force Hc at room temperature is 500 Oe or less, a strong initializing magnetic field as in the prior art is not required. Further, if the coercive force Hc of the reproducing layer 18 is set so that a high-temperature mask can be formed by applying a reproducing magnetic field of 100 Oe or less, the magnetic field leaked from the optical head can be used as the reproducing magnetic field. From these points of view, the composition of the reproducing layer 18 is preferably set as follows:

$$Gd_xFe_yCo_{1-x-y}$$

$$0.23 \leq X \leq 0.25$$

Figure 5:
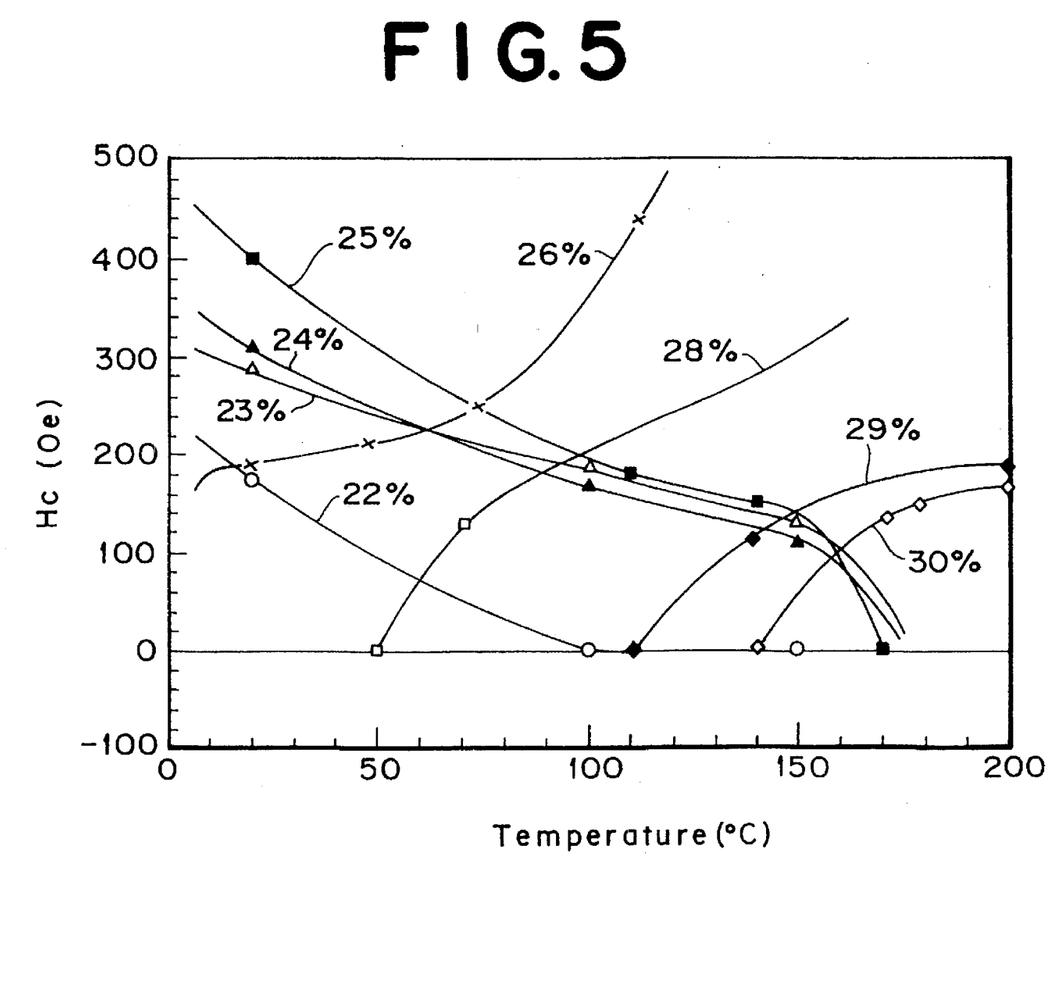
FIG. 5 is a graph showing the temperature dependency of a coercive force Hc with a Gd content in a GdFeCo single-layer film changed.

Proper values of the Gd content will be described with reference to FIG. 5. FIG. 5 shows the temperature dependency of the coercive force Hc with the Gd content in a GdFeCo single-layer film changed. If the Gd content exceeds 25%, the coercive force Hc becomes too large and the film cannot be initialized by a magnetic field of about 500 Oe. Further, a mask cannot be formed at high temperatures by a reproducing magnetic field of about 100 Oe. If the Gd content exceeds 27%, the film becomes an in-plane magnetization film at room temperature, so that a low-temperature perpendicular magnetization mask cannot be formed. Accordingly, the Gd content is preferably set to 25% or less. Further, if the Gd content is 22% or less, the coercive force is reduced, so that a low-temperature perpendicular magnetization mask cannot be formed. Accordingly, the Gd content is preferably set to 23% or more.

EXAMPLE 1

SiN base layer 16, GdFeCo reproducing layer 18, SiN intermediate layer 20, TbFeCo recording layer 22, and SiN protective layer 24 were sequentially formed on glass substrate 14 by sputtering. The formation of each layer by the sputtering was performed in a vacuum chamber under an ultimate vacuum of $5 \times 10^{-5}$ Pa or less. Specifically, the SiN layers 16, 20, and 24 were formed by the sputtering employing an Ar gas pressure of 0.2 Pa and an applied power of 0.8 kW, while the magnetic layers 18 and 22 were formed by the sputtering employing an Ar gas pressure of 0.5 Pa and an applied power of 1.0 kW.

Figure 6:
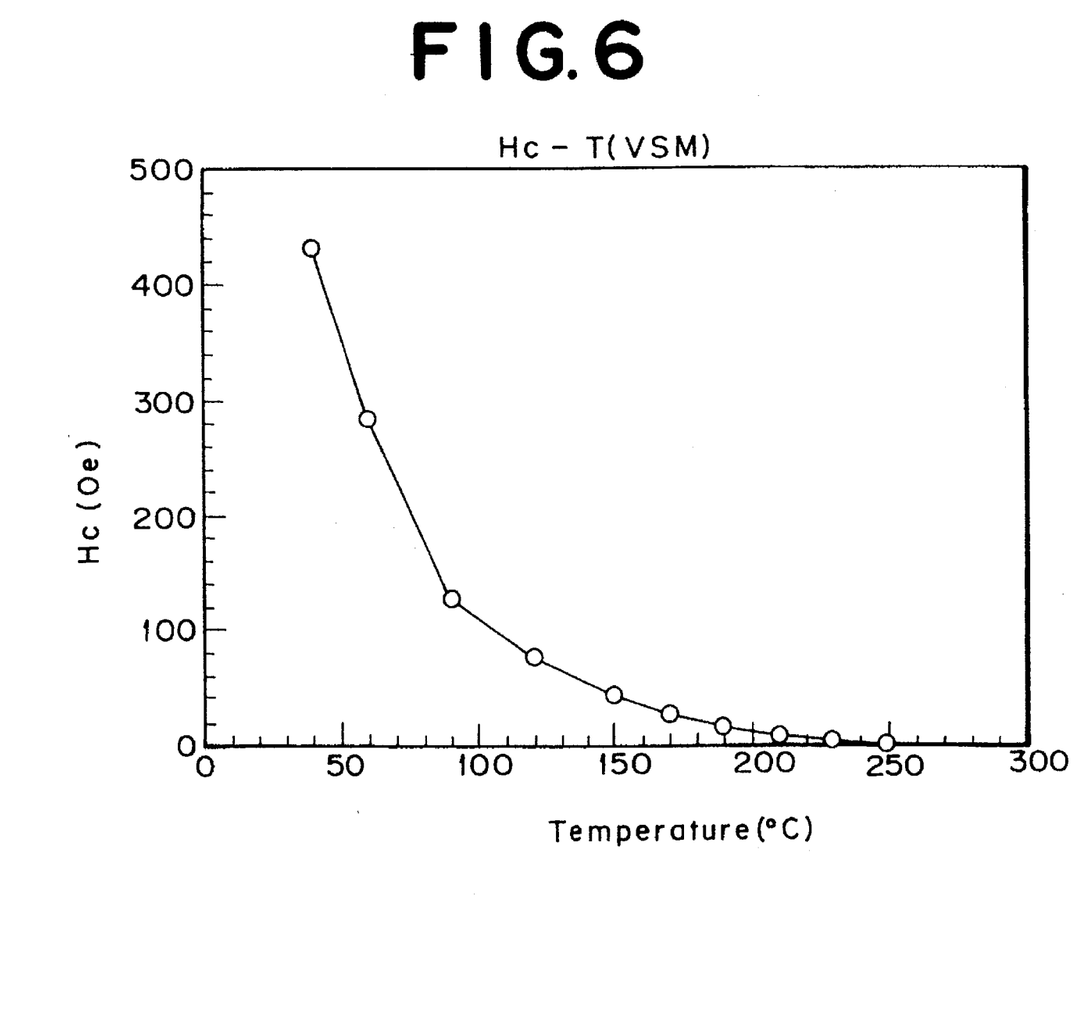
FIG. 6 is a graph showing the temperature dependency of a coercive force Hc of a GdFeCo single-layer film prepared in Example 1.

The composition of the magnetic reproducing layer 18 is $Gd_{25}Fe_{54}Co_{21}$, and the composition of the magnetic recording layer 22 is $Tb_{18}Fe_{68}Co_{14}$. The thicknesses of the layers 16, 18, 20, 22, and 24 are 90 nm, 40 nm, 5 nm, 40 nm, and 45 nm, respectively. The Curie temperature and the compensation temperature of the magnetic reproducing layer 18 is 255° C. and room temperature or less, respectively, and the Curie temperature and the compensation temperature of the magnetic recording layer 22 is 250° C. and 80° C., respectively. FIG. 6 shows the temperature dependency of the coercive force Hc of the GdFeCo single-layer film prepared in Example 1.

A bit having a mark length of 0.4 μm was recorded on the five-layer film prepared above, and the reproducing power dependency of C/N was measured. The recording and reproducing conditions are a linear velocity of 9 m/sec, a recording power of 13 mW, and an emission duty ratio of 25%. Prior to the measurement, a magnetic field of 300 Oe was applied in an erasing direction and simultaneously a reproducing power of 2 mW was applied to initialize the reproducing layer 18. Further, a magnetic field (about 50 Oe) leaked from the optical head was used as the reproducing magnetic field. The result of measurement showed that a C/N of 47 dB was obtained and that even when the reproducing power was increased to 3 mW, the reproduction output was not decreased.

According to the present invention, information recorded on the magneto-optical recording medium can be magnetically-super-resolution-reproduced with a high resolution by using a current magneto-optical disk unit without the use of large initializing magnetic field and a large reproducing magnetic field. Furthermore, even when a reproducing power is increased, a high reproducing resolution can be maintained without widening of a recorded mark transfer region.

What is claimed is:

1. A magneto-optical recording medium comprising:
   a transparent substrate;
   a magnetic reproducing layer laminated on said transparent substrate, said magnetic reproducing layer having an easy direction of magnetization perpendicular to a film surface;
   a nonmagnetic intermediate layers laminated on said magnetic reproducing layer; and
   a magnetic recording layer laminated on said nonmagnetic intermediate layer, said magnetic recording layer having an easy direction of magnetization perpendicular to a film surface;
   wherein when a reproducing laser beam is directed onto said recording medium forming a beam spot, said medium has a temperature distribution in said beam spot, said temperature distribution comprising a low-temperature region satisfying Hc>Hs and Hc>Hr, an intermediate-temperature region satisfying Hs>Hc and Hs+Hc>Hr, and a high-temperature region satisfying Hr>Hs+Hc, where Hc represents a coercive force of said magnetic reproducing layer, Hs represents a magnetostatic bonding force between said magnetic recording layer and said magnetic reproducing layer, and Hr represents a reproducing magnetic field.

2. A magneto-optical recording medium according to claim 1, wherein said magnetic reproducing layer is formed from an amorphous alloy film represented by $Gd_xFe_yCo_{1-x-y}$, where $0.23 \leq X \leq 0.25$.

3. A magneto-optical recording medium according to claim 1, wherein said reproducing magnetic field Hr is 100 Oe or less.

4. A magneto-optical recording medium according to claim 1, wherein said nonmagnetic intermediate layer is formed of a substance selected from a group consisting of Al, Si, Ti, oxides, and nitrides thereof.

* * * * *

UNITED STATES PATENT AND TRADEMARK OFFICE
CERTIFICATE OF CORRECTION

PATENT NO. : 5,627,777
DATED : May 6, 1997
INVENTOR(S) : Tamanoi et al.

It is certified that error appears in the above-indentified patent and that said Letters Patent is hereby corrected as shown below:

On the Title Page:

Under "[75] Inventors" delete "Kenji Shono" and insert --Keiji Shono--.

Signed and Sealed this

Twelfth Day of May, 1998

Attest:

BRUCE LEHMAN

Attesting Officer

Commissioner of Patents and Trademarks